United States Patent
Ju-Sik

(12) United States Patent (10) Patent No.: US 6,679,547 B2
Ju-Sik (45) Date of Patent: Jan. 20, 2004

(54) FRONT PILLAR REINFORCING STRUCTURE OF A VEHICLE

(75) Inventor: Kim Ju-Sik, Ulsan (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 10/308,978

(22) Filed: Dec. 3, 2002

(65) Prior Publication Data

US 2003/0102695 A1 Jun. 5, 2003

(30) Foreign Application Priority Data

Dec. 3, 2001 (KR) .................................. 2001-0075846

(51) Int. Cl.$^7$ .................................................. B60S 7/00
(52) U.S. Cl. ................. 296/203.03; 296/188; 296/189; 296/203.04
(58) Field of Search ....................... 296/203.03, 203.02, 296/203.01, 188, 189, 30, 209, 202, 146.6, 194, 195; 280/751

(56) References Cited

U.S. PATENT DOCUMENTS

| | | | | |
|---|---|---|---|---|
| 4,699,419 A | * | 10/1987 | Kawase et al. | ............. 296/188 |
| 4,826,234 A | | 5/1989 | Komatsu | |
| 4,875,733 A | * | 10/1989 | Chado et al. | .......... 296/203.04 |
| 4,973,103 A | * | 11/1990 | Imajyo et al. | ......... 296/203.04 |
| 5,042,872 A | | 8/1991 | Yoshii | |
| 5,246,263 A | * | 9/1993 | Tanaka et al. | .............. 296/189 |
| 5,246,264 A | * | 9/1993 | Yoshii | ................... 296/203.03 |
| 5,443,297 A | * | 8/1995 | Tanaka et al. | ......... 296/203.03 |
| 5,575,500 A | * | 11/1996 | Mimura et al. | ............. 296/189 |
| 5,586,799 A | * | 12/1996 | Kanemitsu et al. | .... 296/203.02 |
| 5,641,194 A | * | 6/1997 | Honma et al. | .............. 296/188 |
| 5,653,495 A | * | 8/1997 | Bovellan et al. | ............. 296/188 |
| 5,800,007 A | * | 9/1998 | Cho | .......................... 296/188 |
| 5,941,597 A | * | 8/1999 | Horiuchi et al. | ....... 296/203.03 |
| 5,988,733 A | * | 11/1999 | Kamo et al. | ........... 296/203.01 |
| 6,053,564 A | | 4/2000 | Kamata et al. | |
| 6,073,992 A | * | 6/2000 | Yamauchi et al. | ..... 296/203.01 |
| 6,126,232 A | * | 10/2000 | Nakano | ................. 296/203.02 |
| 6,267,437 B1 | * | 7/2001 | Morsch et al. | .............. 296/194 |
| 6,322,124 B1 | | 11/2001 | Kim | |
| 6,364,401 B1 | * | 4/2002 | Kim | ........................... 296/188 |
| 6,409,257 B1 | * | 6/2002 | Takashina et al. | ...... 296/203.03 |
| 6,474,726 B1 | * | 11/2002 | Hanakawa et al. | .... 296/203.03 |
| 6,478,366 B1 | * | 11/2002 | Cheong | ................. 296/203.03 |
| 2001/0039973 A1 | * | 11/2001 | Ishikawa | .................... 138/174 |
| 2002/0190544 A1 | * | 12/2002 | Yamamoto et al. | .... 296/203.03 |

FOREIGN PATENT DOCUMENTS

| | | | |
|---|---|---|---|
| JP | 8 318873 | * | 12/1996 |
| JP | 10 138957 | * | 5/1998 |
| JP | 11 334508 | * | 12/1999 |
| JP | 2000 25647 | * | 1/2000 |
| JP | 2000 225966 | * | 8/2000 |
| JP | 2000 255451 | * | 9/2000 |
| JP | 2001 39334 | * | 2/2001 |
| JP | 2001 55171 | * | 2/2001 |
| JP | 2001 63621 | * | 3/2001 |
| JP | 2002 29455 | * | 1/2002 |
| JP | 2002 347662 | * | 12/2002 |
| JP | 2002 362434 | * | 12/2002 |

* cited by examiner

*Primary Examiner*—Kiran Patel
(74) *Attorney, Agent, or Firm*—Pennie & Edmonds LLP

(57) ABSTRACT

The present invention relates to a front pillar reinforcing structure of a vehicle with a front pillar inner reinforcing panel installed at the part where the front pillar upper mounting bracket and the front pillar hinge bracket are folded to receive an impact caused in a collision due to the balanced strength of the inner and outer sides of the front pillar, thereby effectively absorbing or dispersing the impact, preventing separation of the part coupling the front pillar inner panel and the front pillar outer panel, and minimizing the amount of push of the front pillar toward the interior of the vehicle to protect the passengers to the maximum extent.

4 Claims, 2 Drawing Sheets

FRONT PILLAR REINFORCING STRUCTURE OF A VEHICLE

FIELD OF THE INVENTION

The present invention relates to a front pillar of a vehicle, and more particularly, to a reinforcing panel of the front pillar of a vehicle to improve the strength thereof.

BACKGROUND OF THE INVENTION

A pillar included to support the lateral part of a door and a roof panel in a vehicle usually comprises a front pillar, a center pillar, and a rear pillar. Generally, the structure of the front pillar supporting the front door is constructed of a front pillar inner panel and a front pillar outer panel, with the ends thereof coupled together to form the structure of a closed box in cross-section. A reinforcing member is generally included within the front pillar structure to reinforce the strength of the front pillar. Also generally included, is a front upper mounting bracket and a front hinge bracket located at the external side of the front pillar outer panel.

In the typical design of a front pillar, there can be an imbalance in strength. The internally and externally balanced strength of the front pillar is intended to support an impact. However, the reinforcing members, provide strength only toward the front pillar outer panel. As a result, the typical front pillar fails to secure a balanced support against an impact force from alternate directions. Particularly, it is common that the front hinge bracket is much stronger than the other panels that construct the front pillar and thus, a very severe imbalance of strength is established in the region of the front pillar where the front hinge bracket is located.

Still worse, the unbalanced strength results in separation of the coupling between the front pillar inner panel and the front pillar outer panel. Therefore, in collisions a deformation of the entire front pillar occurs and the front pillar is pushed or deflected into the vehicle passenger compartment thereby failing to effectively protect the passengers of the vehicle.

SUMMARY OF THE INVENTION

The present invention provides a structure of a front pillar of a vehicle to prevent the separation of the front pillar components upon an impact from a collision. Furthermore, the invention provides a structure that reduces the amount of push of the front pillar toward the interior of the vehicle, thereby effectively increasing the safety of the passengers in the vehicle.

Preferably the strengthening of the front pillar is accomplished by placing a front pillar inner reinforcing panel along an inner lateral side of a front pillar inner panel opposite the location of a front hinge bracket on a front pillar outer panel.

BRIEF DESCRIPTION OF THE DRAWINGS

Objects and aspects of the invention will become apparent from the following description of preferred embodiments with reference to the accompanying drawings in which.

DETAILED DESCRIPTION OF THE INVENTION

Hereinafter, the preferred embodiments of the present invention will be described in detail with reference to the accompanying drawings.

Figure 1:
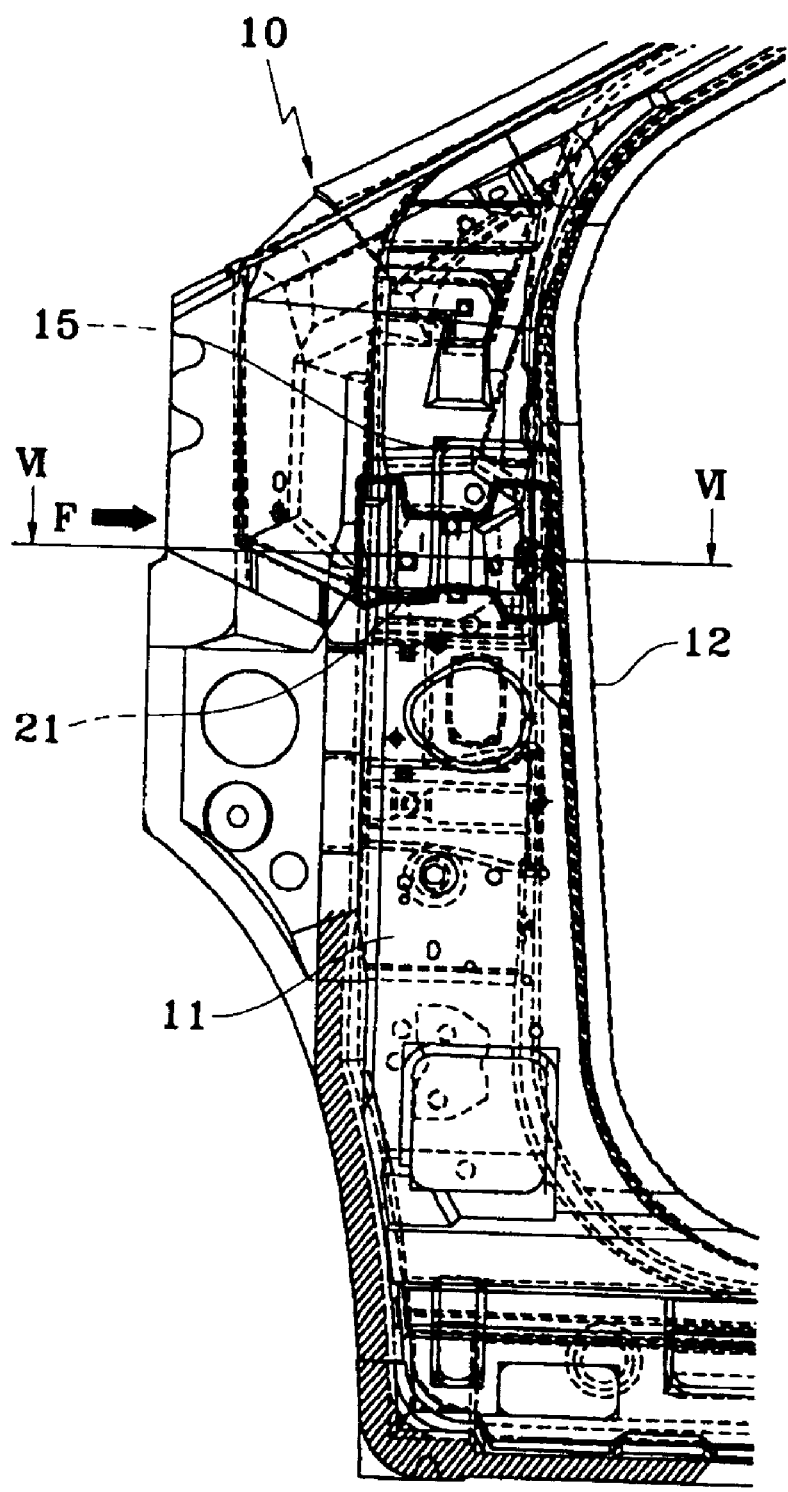
FIG. 1 is a lateral view illustrating the structure of a front pillar in accordance with the present invention.
Figure 2:
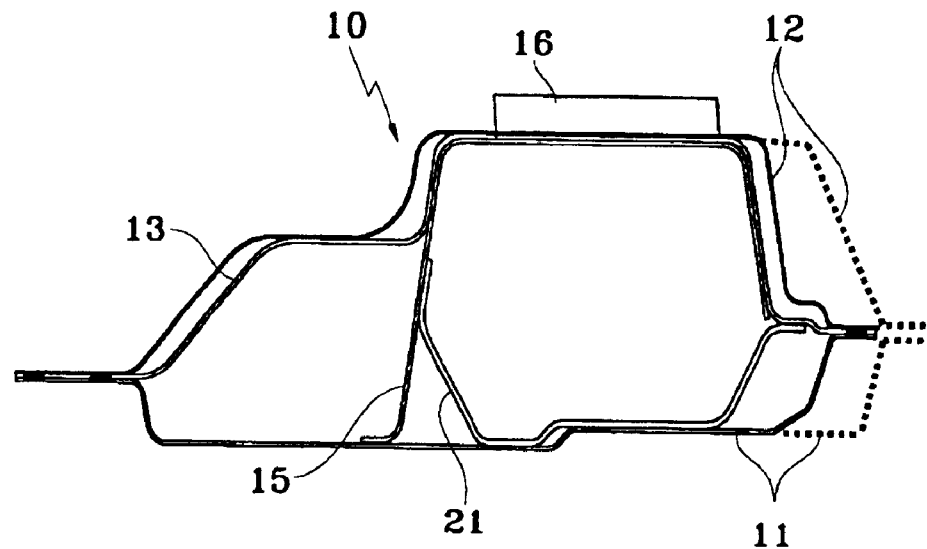
FIG. 2 is a cross-sectional view along line VI—VI in FIG. 1.
Figure 3:
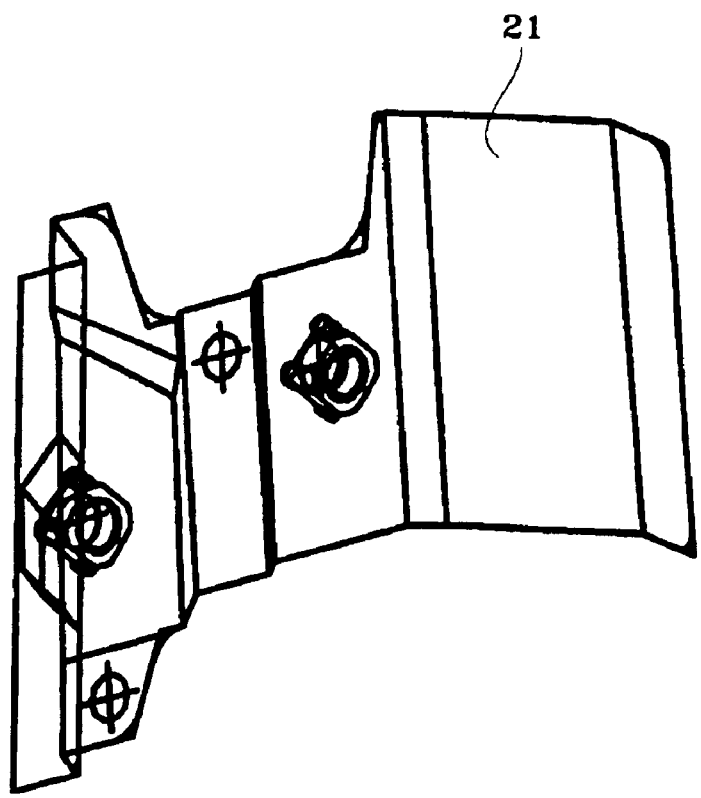
FIG. 3 is a perspective view illustrating a front pillar inner reinforcing panel in accordance with the present invention.

As shown in FIGS. 1 and 2, according to the present invention, a front pillar outer panel 12 is positioned toward the outside of a vehicle and a front pillar inner panel 11 is positioned toward the inner side of the vehicle. The ends of both the front pillar outer panel 12 and the front pillar inner panel 11 are coupled such that a closed box is formed in cross-section. A front pillar inner reinforcing panel 21 is installed along an inner lateral side of the front pillar inner panel 11 across from the front hinge bracket 16.

As shown in FIG. 2, a front pillar outer reinforcing panel 13 is located at the inner side of the front pillar outer panel 12. A front upper mounting bracket 15 is installed at the inside of the front pillar outer reinforcing panel 13. One end of the front upper mounting bracket 15 is coupled with the front pillar inner panel 11.

In a preferred embodiment, the front pillar inner reinforcing panel 21 is installed with one end thereof coupled with the front pillar outer reinforcing panel 13, the other end of the front pillar inner reinforcing panel 21 is coupled with the front upper mounting bracket 15, and the center portion of the front pillar inner reinforcing panel 21 is coupled to the inner side of the front pillar inner panel 11.

The operational effects of the present invention thus constructed will be described below.

When an impact force F, FIG. 1, caused by a collision, or the like, is transmitted to the front pillar 10 (FIG. 2), the front pillar 10 effectively absorbs the impact force F, minimizing the resulting deformation. However, even upon deformation of the front pillar 10, the impact force F, will be distributed in a well-balanced manner across the front pillar 10 due to the characteristics of the front pillar 10 structure shown in FIG. 2.

This well-balanced characteristic of the front pillar 10 results from the front pillar inner reinforcing panel 21 and its placement across from the front hinge bracket 16. The impact force F, (FIG. 1) at the front side of the vehicle, applied to the front hinge bracket 16 is distributed equally to the inner and outer sides of the front pillar 10. As a result, it is possible to minimize deformation of the front pillar 10 upon an impacting force applied to the front side of the vehicle from a collision or the like, thereby improving the safety of the passengers.

As described above, there are advantages in the front pillar reinforcing structure of the present invention in that the front pillar inner reinforcing panel 21 is installed in a position where the front pillar upper mounting bracket 15 and the front pillar hinge bracket 16 are folded or creased to receive an impact caused by a collision. Therefore, the front pillar inner reinforcing panel 21 equally distributes an impact force across the front pillar 10. Due to the balanced strength of the front pillar 10, an impact force is effectively absorbed and dispersed thereby preventing separation of the front pillar inner panel 11 and the front pillar outer panel 12, and, most importantly, minimizing the amount of push or deflection of the front pillar 10 toward the interior of the vehicle, thereby, protecting the passengers.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A front pillar reinforcing structure of a vehicle, comprising:
    a front pillar inner reinforcing panel placed along an inner lateral side of a front pillar inner panel such that said front pillar inner reinforcing panel is opposite a front hinge bracket located on a front pillar outer panel;
    a front pillar outer reinforcing panel configured at the inner side of said front pillar outer panel;
    a front upper mounting bracket configured at the inner side of said front pillar outer reinforcing panel wherein one end of said front upper mounting bracket is coupled to said front pillar inner panel; and
    wherein said front pillar inner reinforcing panel is installed with one end thereof coupled with said front pillar outer reinforcing panel and the other end thereof coupled with said front upper mounting bracket and wherein a section of said front pillar inner reinforcing panel is attached to said front pillar inner panel such that said front pillar inner reinforcing panel is coupled to at least three different front pillar panels.

2. A front pillar, comprising:
    a front pillar outer panel configured toward an external side of a vehicle;
    a front pillar inner panel configured toward an internal side of said vehicle wherein ends of said front pillar outer panel are coupled with ends of said front pillar inner panel forming a closed box;
    a front pillar outer reinforcing panel configured at an inner side of said front pillar outer panel;
    a front upper mounting bracket configured at an inside of said front pillar outer reinforcing panel, and wherein one end of said front upper mounting bracket is coupled with said front pillar inner panel;
    a front hinge bracket; and
    a front pillar inner reinforcing panel being coupled to at least three of above said panels at a position opposite said front hinge bracket.

3. The front pillar reinforcing structure of a vehicle of claim 2, wherein one end of said front pillar inner reinforcing panel is coupled to said front pillar outer reinforcing panel and the other end is coupled to said front upper mounting bracket and wherein a portion between said ends of said front pillar inner reinforcing panel is coupled to said front pillar inner panel such that an impact force applied to said front hinge bracket is equally distributed across said front pillar thereby minimizing the amount of deflection of said front pillar toward the interior of the vehicle.

4. A front pillar for a vehicle, comprising:
    an outer panel;
    an inner panel coupled with said outer panel such that a substantially closed member is formed in cross section;
    a mounting bracket coupled near one edge with said outer panel and coupled near a second edge with said inner panel within said substantially closed member; and
    an inner reinforcing panel configured and coupled at three locations within the substantially closed member at a position opposite a hinge bracket.

* * * * *